United States Patent
Randall et al.

(10) Patent No.: US 10,119,095 B2
(45) Date of Patent: Nov. 6, 2018

(54) SYSTEM AND METHOD FOR PROCESSING ALGAE-BASED PRODUCTS USING RECOVERED FLUE GAS HEAT

(71) Applicant: T2 ENERGY, LLC, Vista, CA (US)

(72) Inventors: Mark Randall, Vista, CA (US); Mark Olson, Vista, CA (US); Elmar Schmid, Vista, CA (US)

(73) Assignee: T2 Energy, LLC, Vista, CA (US)

( * ) Notice: Subject to any disclaimer, the term of this patent is extended or adjusted under 35 U.S.C. 154(b) by 0 days.

(21) Appl. No.: 15/421,347

(22) Filed: Jan. 31, 2017

(65) Prior Publication Data
US 2017/0233678 A1    Aug. 17, 2017

Related U.S. Application Data

(60) Provisional application No. 62/294,197, filed on Feb. 11, 2016.

(51) Int. Cl.
| | |
|---|---|
| C11B 1/10 | (2006.01) |
| C11C 3/00 | (2006.01) |
| B01D 11/04 | (2006.01) |
| B01D 53/84 | (2006.01) |

(52) U.S. Cl.
CPC ............ *C11B 1/10* (2013.01); *B01D 11/0492* (2013.01); *B01D 53/84* (2013.01); *C11C 3/003* (2013.01)

(58) Field of Classification Search
CPC .. C11B 1/10; C11B 1/06; C11C 3/003; B01D 11/0492; B01D 53/84
See application file for complete search history.

(56) References Cited

U.S. PATENT DOCUMENTS

| | | | | |
|---|---|---|---|---|
| 2011/0076748 | A1* | 3/2011 | Salvo | C12N 1/06 435/257.1 |
| 2012/0116138 | A1* | 5/2012 | Goodall | C10G 45/08 585/357 |
| 2013/0305599 | A1* | 11/2013 | Rettenmaier | B01D 53/84 44/603 |
| 2014/0179781 | A1* | 6/2014 | Waibel | A61K 31/202 514/560 |
| 2014/0243540 | A1* | 8/2014 | Kadam | A61K 36/02 554/207 |
| 2014/0290266 | A1* | 10/2014 | Veilleux, Jr. | F02C 9/263 60/776 |

OTHER PUBLICATIONS

Patent Cooperation Treaty, International Search Report for PCT/US201/017555, dated May 4, 2017, pp. 1-2.

* cited by examiner

*Primary Examiner* — Yate' K Cutliff
(74) *Attorney, Agent, or Firm* — Sheppard Mullin Richter & Hampton LLP

(57) ABSTRACT

A method for processing algae-based products using flue gas heat includes mixing flue gas with water, receiving a heated gas in a first enclosure of a heat exchanger, receiving an algal paste in a second enclosure of the heat exchanger, introducing an organic solvent to the algal paste, extracting an algal oil and a plurality of algal shells from the algal paste by dissipating heat from the first enclosure to the second enclosure; and extracting the algal oil from the organic solvent and the algal shells.

14 Claims, 9 Drawing Sheets

SYSTEM AND METHOD FOR PROCESSING ALGAE-BASED PRODUCTS USING RECOVERED FLUE GAS HEAT

CROSS-REFERENCE TO RELATED APPLICATIONS

This application claims priority to U.S. Provisional Patent Application No. 62/294,197, entitled "SYSTEM AND METHOD FOR PROCESSING ALGAE-BASED PRODUCTS USING RECOVERED FLUE GAS HEAT," filed on Feb. 11, 2016, the contents of which are incorporated herein by reference.

TECHNICAL FIELD

The disclosed technology relates generally to green energy. In particular, this application discloses systems and methods for processing algae-based products using recovered flue gas heat.

BACKGROUND

Green energy sources have grown in importance over the last decade. Moreover, controlling the release of greenhouse gases, such as carbon dioxide, while still producing affordable and sustainable energy has become vitally important. Not only has an effort to reduce such emission been pushed to the forefront of modern research because of concerns over climate change, but has also become increasingly significant to industrial companies operating under heavy regulatory pressure. Indeed, many Western governments continue to pass increasingly more stringent regulations that effect companies that produce potentially harmful emissions (i.e. cap-and-trade). Thus, a need has emerged for economically viable methods to reduce harmful greenhouse gas emissions.

In particular, power plants that burn organic fuels such as coal, natural gas, wood, biomass, or oil emit carbon dioxide ($CO_2$) and other harmful pollutants into the atmosphere during operation. Commonly used non-organic technologies to reduce these emissions are costly, inefficient, and not 100% effective. While organic emission reducing technologies can also be used, currently available technology has lacked the efficiency to gain commercial popularity. For example, microalgae naturally may be used to convert $CO_2$ into oxygen ($O_2$). However, microalgae cultivation systems designed to reduce flue gas emissions generally lack the efficiency to be considered commercially viable. Moreover, incorporating such technologies into power plant operations adds cost with little benefit to the company, other than adhering to regulations. While microalgae can produce lipid-based oils, or bio-oils, as a byproduct creating a potential supplemental energy or revenue source for the company, currently available technology is incapable of producing sufficient levels of this biofuel to make the solution economically viable.

Recently, "lipid triggers" have been discovered that can dramatically boost bio-oil creation efficiency in microalgae. This discovery has made possible the prospect of sufficiently efficient, economical, and commercially viable flue gas emission reduction. In turn, a developing commercial need has emerged for a microalgae growing system and process that incorporates lipid trigger technology and that is capable of efficiently and economically reducing harmful flue gas emissions while producing sufficient levels of bio-oil in return.

Power plants use heat exchangers to reduce the heat of the flue gas. At older power plants the starting temperature post combustion of fuel may exceed 400 degrees Celsius. At newer plants that have a combined heat and steam turbine system, heat exchange temperatures may still exceed 200 degrees Celsius.

BRIEF SUMMARY OF EMBODIMENTS

According to various embodiments of the disclosed technology, systems and methods for processing algae-based products using recovered flue gas heat is described. In particular, in accordance with some embodiments of the disclosed technology are directed towards using excess heat from a host power plant, before that heat may dissipate as waste energy, by introducing algae, grown for use as an emissions capture system, into a heat exchanger coupled to the power plant's exhaust. Using the heat generated from the power plant, and either adding organic solvents and adjusting pressure and time to the flue gas, lipids may be liberated from the algae cell wall, resulting in a mixture of lipids, cell walls, and/or other elements or taking the algae paste and introducing the mixture to a Hydrothermal Liquefaction to produce bio crude. If using organic solvents once lipids and cell walls are separated, additional solvents may be added to a holding tank where specific gravity may isolate the lipids from the cell walls (i.e., the algae shells). The oil or lipids may float to the top and be skimmed off and pumped to a holding tank where an organic solvent (e.g., methanol, ethanol, etc.) may be added along with a catalyst to trans-esterfy the oil and produce byproducts such as glycerol and biodiesel.

The glycerol may concentrate the solvent, and the mixture may be introduced to another entry point of the heat exchanger to volatilize the solvent and recover it for re-use. The biodiesel may be distributed and sold into the transportation market. Alternatively, in some embodiments, the unprocessed harvested water and algae may be introduced to the heat exchanger to initially remove water converting it to steam for release to the atmosphere.

In some examples, an algae-based Carbon capture system (e.g., the system described in this disclosure) may be used to capture flue gas that is rich in $CO_2$, which would normally be emitted into the atmosphere. Algae growing in the system can be harvested on a recurring basis to maintain system capacity and performance for processing $CO_2$ emissions, and for the purposes of producing algae-based products. Algae coming out of the system may be very wet. The wet harvested algae may be de-watered and concentrated using techniques such as flocculation, filter press, membrane separation, or other de-watering or dehydration techniques as known in the art.

The heat exchanger system will have a heat source-side input (i.e., to accept hot flue gas or other gas from the power plant), a heat source-side output (i.e., to exhaust flue gas once heat has been dissipated through the heat exchanger) and one or more heat sink-side inputs and outputs. The de-watered algae paste may be pumped or augured into a piping configuration that is incorporated into the power plant's heat exchange system, i.e., by pumping the de-watered algae paste into an input end of a first heat sink-side enclosure of the heat exchanger system, where the de-watered algae paste may be exposed to heat generated by the power plant. Each heat sink-side enclosure may be formed using a piping system that interleaves with the heat source-side enclosure (e.g., using a serpentine style heat exchange layout, or other heat exchange layout as known in the art.

Steam from the algae paste may be exhausted from the heat exchanger system using a gas release system (i.e., an exhaust valve).

As the algae paste dries further, it may form an algae cake, which may be moved through the heat exchange system using pressure, auger, or a pumping mechanism. Organic solvents may be added into this system to facilitate lipid extraction and liberation. The heat exchange system may be equipped with sensors, monitors, pumps, valves, or other controls to control flow rate, heat and pressure.

In some embodiments, the algae may be exposed to heat from the heat exchanger to hydrothermally liquefy the algae into a bio-crude that can be further processed into various bio-products.

A system to recover any volatized solvents (i.e., in the form of a secondary enclosure and a valve) may be disposed at the output end of the first heat sink-side enclosure. Through this system, lipids grown inside the algae organisms may be liberated from their cell walls/shells. These liberated lipids and shells may be pumped to a first holding tank where the mixture may be separated using specific gravity causing the lipids or oil to rise to the top of the first holding tank and the shells to settle on the bottom of the first holding tank.

The oil may then be skimmed off and sent to a second holding tank where methanol and/or similar solvents may be added along with a catalyst that will complete the transesterification process (i.e., resulting in the production of biodiesel fuel). Glycerol may be deposited at the bottom of the second holding tank. The glycerol may be pumped to an input end of a second heat sink-side enclosure of the heat exchanger system. As it is exposed to heat, the glycerol may be separated from the solvent. Both may be recovered for use.

The algae shells may be pumped to an input end of a third heat sink-side enclosure of the heat exchanger system to recover the organic solvents and complete the drying of the shells. The shells can be used as a feed for livestock, raw material that can be converted to plastic pellets for injection molding or to produce bio-gasoline or bio-jet fuel to name a few.

Method for Processing Flue Gas

A method for processing flue gas may include preprocessing flue gas, mixing flue gas with water, processing the gas-water mixture, distributing the gas-water mixture into a processing cell, stimulating algae growth, and harvesting algae. Processing flue gas may include adjusting the temperature of the flue gas to be conducive to algae growth. Mixing the flue gas may include introducing the flue gas into the water through a one-way valve, or backflow preventer such that water does not flow back into the flue gas exhaust of the producing plant. Processing the gas-water mixture may include infusing the mixture with nutrients for the algae and/or with a lipid trigger to stimulate the algae to produce bio-oil at an increased rate. Distributing the flue gas may include controlling the release-rate of gas-water mixture into the processing cells.

Stimulating the algae growth may include exposing the gas-water mixture to light at optimal wavelengths for algae growth and mixing or stirring the water to move algae and nutrients. Harvesting the algae may include promoting the algae to the top of the processing cell and skimming the surface water of the cell. For example, the algae may be promoted to the top of the processing cell by increasing the flow of gas-water mixture from bubblers at the bottom of the processing cell. In some embodiments, environmental variables are monitored with environmental sensors to enable tuning of temperatures, pressures, $CO_2$ levels, lipid trigger infusion, nutrients infusion, exhausting of gases from the system, or other environmental conditions.

System for Processing Flue Gas

A system for processing flue gas comprises a gas distribution system that pneumatically couples multiple watertight processing cells to flue gas exhaust from an industrial facility such as an energy plant. The multiple processing cells are filled with water and enclosed in an airtight enclosure. Each cell is isolated from the other cells to avoid cross-contamination. In addition, a bottom side, or floor of each cell may comprise a plurality of bubblers, wherein each bubbler pneumatically couples to the gas distribution system such that flue gas flowing from the industrial facility exhaust through the gas distribution system may be released into the cell. Further, each cell may comprise a plurality of light emitting columns, a movable grate, and multiple guide columns. The cell may be further configured such that: (i) the light emitting columns protrude downward from a top surface of the cell to provide a light source to effectively grow algae; (ii) the guide columns protrude upward from a bottom surface of the cell to guide the movement of the movable grate; (iii) the grate slidably couples to the guide columns and further comprises a plurality of apertures shaped to match the profile and positioning of the light emitting columns and to enable sufficient water flow through the moving grate; and (iv) multiple ballast tanks to control movement of the grate.

In some embodiments, the light emitting columns may comprise light emitting diodes (LEDs), and in an exemplary embodiment, the LEDs emit light at optimal wavelengths for growing algae. In addition, the gas distribution system may further comprise a heat exchanger to reduce the temperature of hot flue gas exhaust to a temperature conducive to algae growth, and may also further comprise a backflow prevention system to stop water from the cells from flowing backwards through the gas distribution system and into the flue gas exhaust. The gas distribution system may also comprise a pH control system and/or a nutrient infusing system located between the backflow prevention system and the processing cells. Water will have flooded this location of the gas distribution system, allowing the flue gas to mix with water and enabling pH adjustment and nutrient addition. For example, the pH control system may use limestone to adjust the pH of the $CO_2$-rich water. The nutrients infusion system may be used to infuse a lipid trigger into the water. Lipid triggers stimulate the algae metabolism to store excess solar energy as lipids, thus increasing the production rate of bio-oil.

In other exemplary embodiments of the disclosure, the gas distribution system may further comprise a water holding tank positioned in front of the processing cells but after the backflow prevention system such that $CO_2$-rich flue gas and water can be mixed in holding tank.

In many embodiments of the disclosure, the enclosure further comprises a gas return system that pneumatically couples a top side of the enclosure to the gas distribution system, but that also comprises a pressure release valve to controllably release gas from the enclosure into the atmosphere. The gas return system may further comprise temperature, pressure, $CO_2$ level, and/or other sensors to monitor the environmental conditions of the enclosure. The data returned from these sensors may be used to manually or automatically adjust the pressure release valve such that more or less gas is returned to the gas distribution system. For example, if $CO_2$ readings are high, more gas may be returned. In addition, the temperature sensors, flow sensors, and other environmental monitoring sensors may be located on the gas distribution system, as well as in the processing cells themselves to monitor environmental conditions.

In some embodiments of the disclosure, an algae harvesting system may mechanically couple to the enclosure. The algae harvesting system may be a skimming device that collects algae from a top surface of the water in each cell to collect and separate algae from the water. Alternatively, the algae harvesting system may harvest algae starting from the bottom of the bioreactor cell. In these embodiments, algae is pushed to the top of any particular cell by increasing the amount of gas released by the cell's bubblers.

Other features and aspects of the technology described herein will become apparent from the following detailed description, taken in conjunction with the accompanying drawings, which illustrate, by way of example, the features in accordance with embodiments of the disclosed technology. The summary is not intended to limit the scope of this disclosure.

BRIEF DESCRIPTION OF THE DRAWINGS

The technology described herein, in accordance with one or more various embodiments, is described in detail with reference to the following FIGURES. The drawings are provided for purposes of illustration only and merely depict typical or example embodiments. These drawings are provided to facilitate the reader's understanding of the disclosed technology and shall not be considered limiting of the breadth, scope, or applicability thereof. It should be noted that for clarity and ease of illustration these drawings are not necessarily made to scale.

The FIGURES are not intended to be exhaustive or to limit the technology to the precise form disclosed. It should be understood that the technology described herein can be practiced with modification and alteration, and that the invention be limited only by the claims and the equivalents thereof.

DETAILED DESCRIPTION OF THE EMBODIMENTS OF THE INVENTION

The technology described herein is directed towards systems and methods for processing algae-based products using recovered flue gas heat.

From time-to-time, the technology is described herein in terms of example embodiments, environments and applications. Description in terms of these embodiments, environments and applications is provided to allow the various features and embodiments of the disclosed technology to be portrayed in the context of an exemplary scenario. After reading this description, it will become apparent to one of ordinary skill in the art how the technology can be implemented in different and alternative embodiments, environments and applications.

Figure 1:
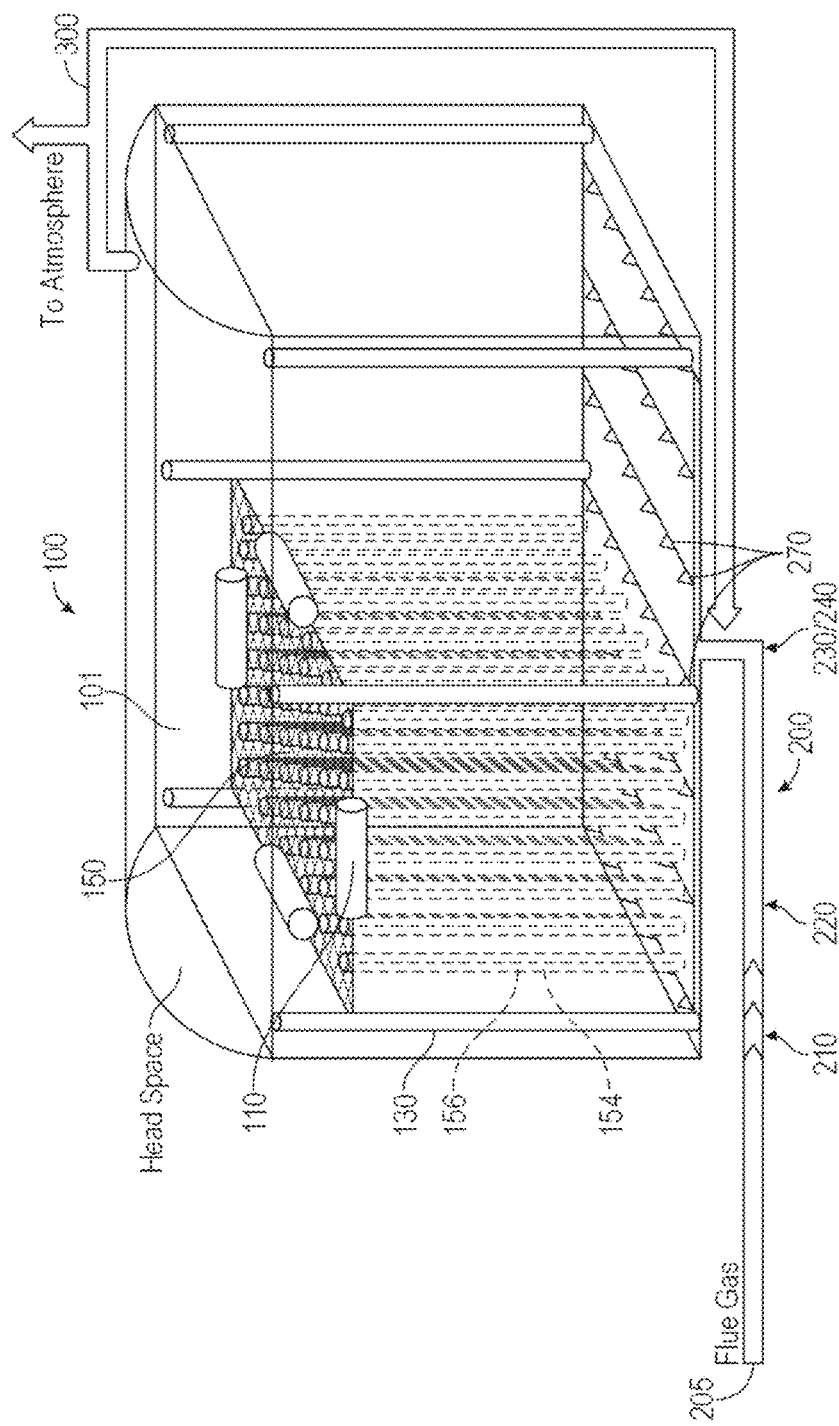
FIG. 1 illustrates a perspective view of a flue gas recycling system.

FIG. 1 is a perspective view illustrating a flue gas recycling system. Referring now to FIG. 1, a flue gas recycling system comprises a gas distribution system 200, an enclosure 100 comprising one or more processing cells 101, and a gas recovery system 300. A flue gas exhaust system from an industrial plant—for example a power plant—pneumatically couples to a gas distribution system 200 such that $CO_2$-rich flue gas 205 flows into the gas delivery system. Gas distribution system 200 pneumatically couples to a bottom surface of the enclosure through a plurality of bubblers 270. In some exemplary embodiments, a top surface of the enclosure is extended or bowed outward to create a cavity above the water surface in each processing cell 101 to collect accumulating gas percolating up or leaving solution from the water.

Still referring to FIG. 1, each cell 101 comprises a plurality of guide columns 130, a plurality of light emitting columns 156, and a moveable grate 150, the moveable grate comprising a plurality of ballast tanks 110 and a plurality of apertures. The guide columns 130 may protrude upward from a bottom surface of the cell, and the light columns 156 may protrude downward from a top surface of the cell.

The moveable grate 150 may be shaped to fit the profile of the cell, and to slidably couple to the guide columns such that the grate may freely slide up or down within the cell cavity. In addition, the apertures in the grate are shaped to accept the profile of the light emitting columns 156 with sufficient clearance to also enable water to freely flow through the grate when it moves. Further, the apertures are positioned on the grate to match the orientation of the light emitting columns. As such, when the grate 150 is positioned in the cell cavity and coupled to the guide columns 130, the light columns 156 protruding from the top surface of the cell also fit through the apertures. As a result, the grate may move freely without interfering with or contacting the light columns.

In some embodiments, brushes or scrapes protrude from the inside edge of the apertures and contact the guide columns and/or light columns such that algae and/or debris is scraped from the surface of the guide columns and/or light columns when the grate moves up or down.

Still referring to FIG. 1, each ballast tank 110 may be pneumatically coupled to the gas distribution system through a valve such that flue gas may controllably be diverted into the tank. Each ballast tank may further comprise a hydraulic valve to controllably enable water to fill the tank. Thus, each tank may be controllably filled with either water, gas, or a combination thereof to control the buoyancy of the tank, and of the attached grate 150, in the water-filled cell 101. Accordingly, filling the ballast tanks with air will increase their buoyancy and cause the grate to float in an upward direction, and filling the ballast tanks with water will decrease their buoyancy, causing the grate to sink in a downward direction. These steps of filling the tank with gas and then with water may be repeated to cause the grate to move up and down repeatedly. This grate movement may be used to move and mix algae growing in the cell, as well as nutrients, to increase the probability that any particular algae specimen will have adequate and balanced exposure to nutrients and light.

Still referring to FIG. 1, the bottom surface of the enclosure 100 may also serve as the bottom surface of each cell 101. A subset of the plurality of bubblers may be dispersed throughout the bottom surface of each cell. Each bubbler 270 comprises a valve enabling $CO_2$ and nutrient rich gas or gas-solution to be controllably released into the cell 101. Under normal operation, the release of this gas or gas-solution may be controlled to create an optimal growing environment for the algae. As the algae grow, it also converts light energy into starch and lipids. These lipids are a type of oil that may be used as biofuel, bioplastic, biochemical, biocosmetic, or other bio-oil based products. When the algae has generated sufficient quantities of this bio-oil, it may be harvested by increasing the rate at which the bubblers release gas into the cell, thus pushing the algae to the surface of the water where it may be skimmed and collected.

In some embodiments, the light emitting columns comprise protective translucent tubes and an inner light emitting element 154. In an exemplary embodiment, this light emitting element comprises LEDs configured to emit light at optimal wavelengths conducive to algae growth. In some embodiments, these light emitting columns 156 protrude from the top surface of the cell and extend downward to approximately 1 meter from the bottom surface of the cell. Further, in some of these embodiments, the light emitting columns 156 are positioned in a grid pattern with the centers of each adjacent light emitting column separated by between 60 cm and 100 cm. However, these dimensions are exemplary, and other configurations with other light emitting column length, positioning, and spacing may be used depending on optimal growing conditions. For example, the light emitting columns may extend downward to between 5 meters and 0.1 meters of the bottom surface of the cell, and they may be positioned in multiple different orientations with the centers of adjacent light emitting columns spaced from between 0.1 meters to 5 meters apart. These special orientations and parameters may be optimized for particular algae strains.

In some embodiments, a processing cell may further comprise an auger system mechanically coupled to a bottom surface of the cell to remove particulate matter and other more dense materials that will sink instead of float to surface.

Figure 2:
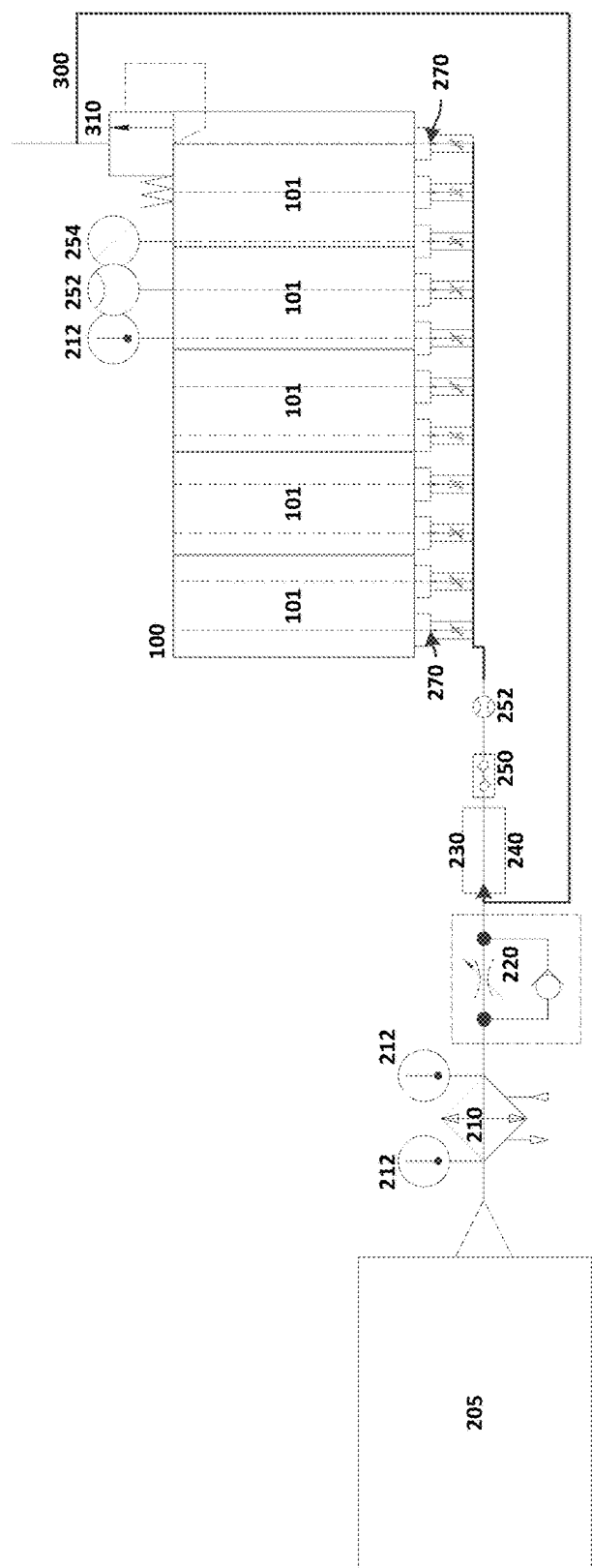
FIG. 2 illustrates a gas distribution system from a flue gas recycling system.

FIG. 2 is a cross-section schematic diagram of the gas distribution system 200 and the gas return system 300. Referring now to FIG. 2, the industrial plant's flue gas exhaust 205 pneumatically couples to the gas distribution system 200, the gas distribution system 200 pneumatically couples to the enclosure 100, and the enclosure 100 pneumatically couples to gas return system 300, wherein gas return system 300 also pneumatically couples to gas distribution system 200.

Still referring to FIG. 2, the gas distribution system may further comprise a heat reducing system 210 to reduce the heat of the flue gas such that gas released into the processing cells 101 is safe and conducive for algae growth. For example, the heat reducing system may be a heat exchanger. The gas distribution system may further comprise temperature sensors 212 to monitor temperature of the flue gas before and/or after being processed through the heat exchanger, as well as for monitoring the temperature within the cells and the enclosure to ensure that optimal growing conditions for the algae are maintained. Additionally, the gas distribution system may further comprise a backflow prevention system 220 to prevent water from the cells from flowing back through the gas distribution system and into the power plant's furnaces or other equipment. Notably, water may flow into and fill the gas distribution system from the cells 101 through the bubblers 270 all the way up to the backflow reduction system 220. Thus, water and flue gas may mix in the flooded parts of the gas distribution system. In some embodiments, the gas distribution system may further comprise a water holding tank to facilitate mixing of flue gas and water.

Still referring to FIG. 2, in some embodiments, the gas distribution system further comprises a pH control system 230. For example, the pH control system may use a limestone additive to adjust the pH of the water and $CO_2$ solution to safe and optimal levels for algae growth. Further, in some embodiments, the gas distribution system may also comprise a nutrient infusion system 240. The nutrient infusion system enables the addition of nutrients into the $CO_2$ solution to further stimulate algae growth and lipid production. In some exemplary embodiments, the nutrients infusion system is configured to introduce a lipid trigger into gas distribution system. The lipid trigger is a compound known to trigger algae to rapidly produce and store lipids. These lipids are the raw material that can be used to produce a bio-oil that may be harvested from the algae.

Still referring to FIG. 2, in some embodiments the gas distribution system may further comprise flow control valve 250 and flow meter 252, enabling control of the overall rate at which flue gas is released into the enclosure. Additionally, the gas return system 300 may comprise pressure release valve 310 to controllably vent gas into the atmosphere or return gas to the gas distribution system 200. Temperature, pressure, $CO_2$ level, and other environmental sensors 212, 252, and 254 may be located at various positions within the enclosure to monitor environmental conditions. One example of possible positions for these sensors is illustrated in FIG. 2. Feedback from these sensors may be used to control environmental conditions in the flue gas recycling system. For example, the feedback data may be used to determine whether and how much gas is vented into the atmosphere as opposed to returned to the gas distribution system. For example, if detected $CO_2$ rates are relatively high, then more $CO_2$-rich gas may be returned to the gas distribution system, but if $CO_2$ rates are relatively low and $O_2$ rates are high, then more gas may be vented into the atmosphere. In addition, the feedback data may be used to control release rates of gas into specific processing cells, pH adjustments, and release rates of nutrients.

Figure 3:
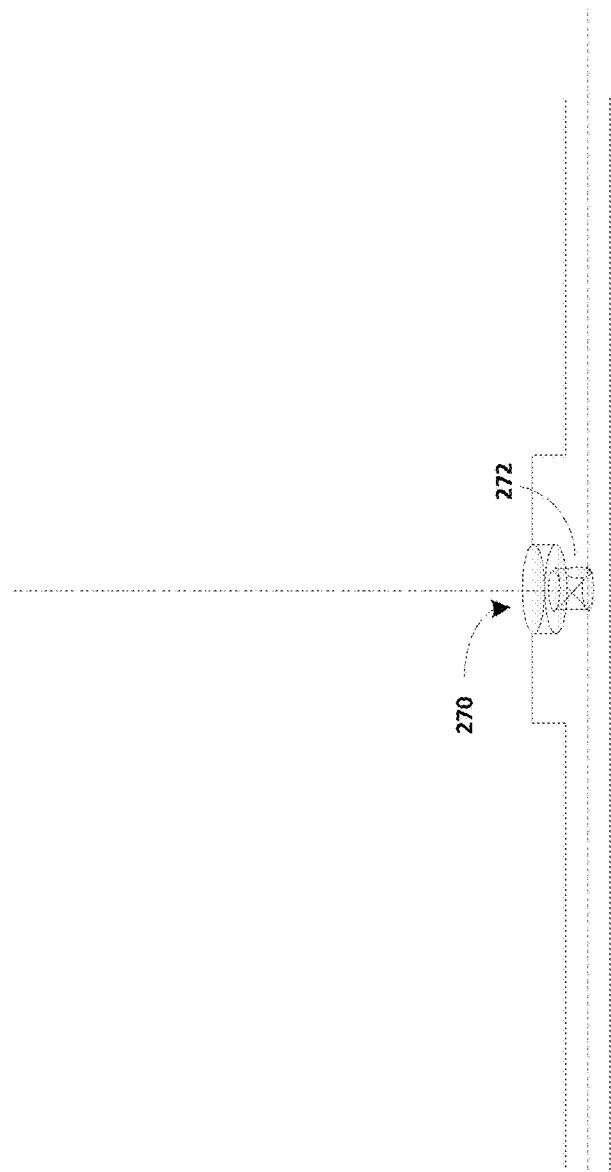
FIG. 3 illustrates a bubbler from a flue gas recycling system.

FIG. 3 is a diagram illustrating a bubbler 270. Referring to FIG. 3, the bubbler 270 comprises an orifice and a valve 272. The valve 272 enables the controllable release of $CO_2$ and/or nutrient-rich solution from the orifice, allowing the gas and nutrients to percolate upwards through the processing cell 101 to efficiently stimulate algae growth.

Figure 4:
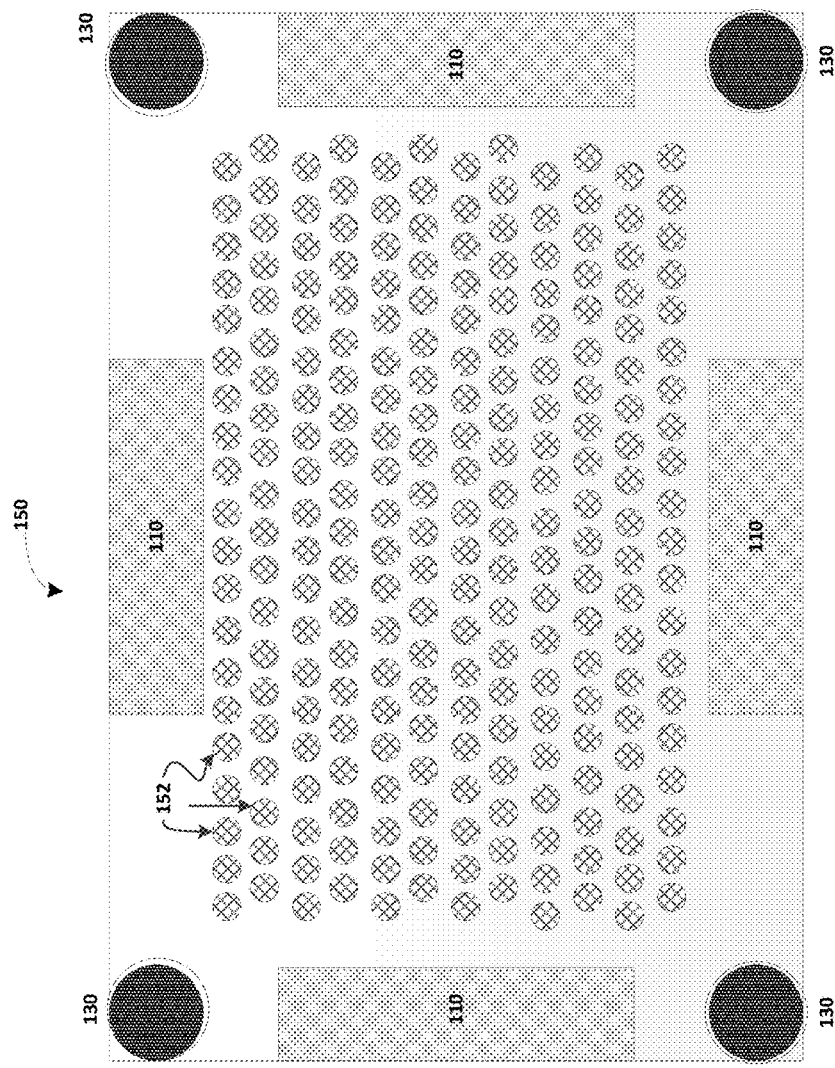
FIG. 4 illustrates a moveable grate from of a flue gas recycling system.

FIG. 4 is top-down view of a movable grate 150. Referring to FIG. 4, the grate comprises a plurality of ballast tanks 110 and a plurality of apertures 152. The apertures are shaped and positioned such that the light emitting columns will fit through the apertures with sufficient clearance to also enable water to flow through the grate when the grate moves up or down within the cell. Further, as discussed, the grate is slidably coupled to support columns 130 to guide the vertical movement of the grate caused by adjusting the levels of gas and water in ballast tanks 110. While FIG. 4 illustrates four support columns and four ballast tanks, it should be noted that other configurations are possible incorporating different varying quantities of ballast tanks and support columns. Further, the particular configuration, shape, and size of apertures 152 is shown for exemplary purposes only, and different shapes, sizes, and configurations are possible and contemplated.

Figure 5:
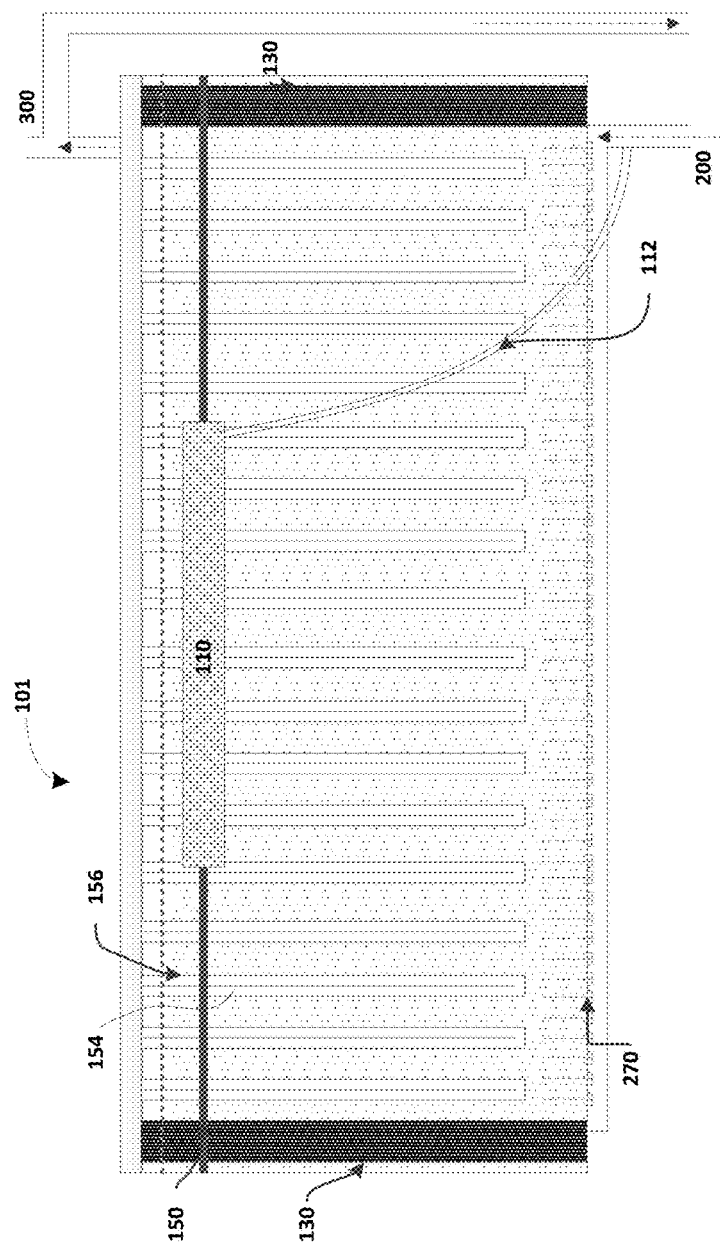
FIG. 5 illustrates a cross-section of a processing cell from a flue gas recycling system.

FIG. 5 is a cross-section diagram illustrating a cell 101. Referring to FIG. 5, ballast tanks 110 pneumatically couple to gas delivery system 200 through connector 112. This illustration further depicts an exemplary configuration of the cell wherein the moveable grate 150 is slightly below the surface of the water contained within the cell 101. However, as previously described, the grate's vertical position may be adjusted by varying the levels of gas and/or water in ballast tanks 110 to float or submerge the grate to desired depths.

In some embodiments, a mechanical or robotic skimmer may be utilized to harvest oil-rich algae. Algae may be promoted to the top of a particular cell by increasing the gas release rate from the bubblers coupled to that cell. In another exemplary embodiment, a compressed air tank or air compressor may be incorporated into the gas distribution system to further control the air pressure and allow for increased airflow through the system during algae harvest. Accordingly, the gas will push the algae to the top of the cell and a mechanical or robotic skimming device can be used to collect the algae. In one such example, the skimming device is a robotic floating device, similar to a floating pool sweep.

Figure 6:
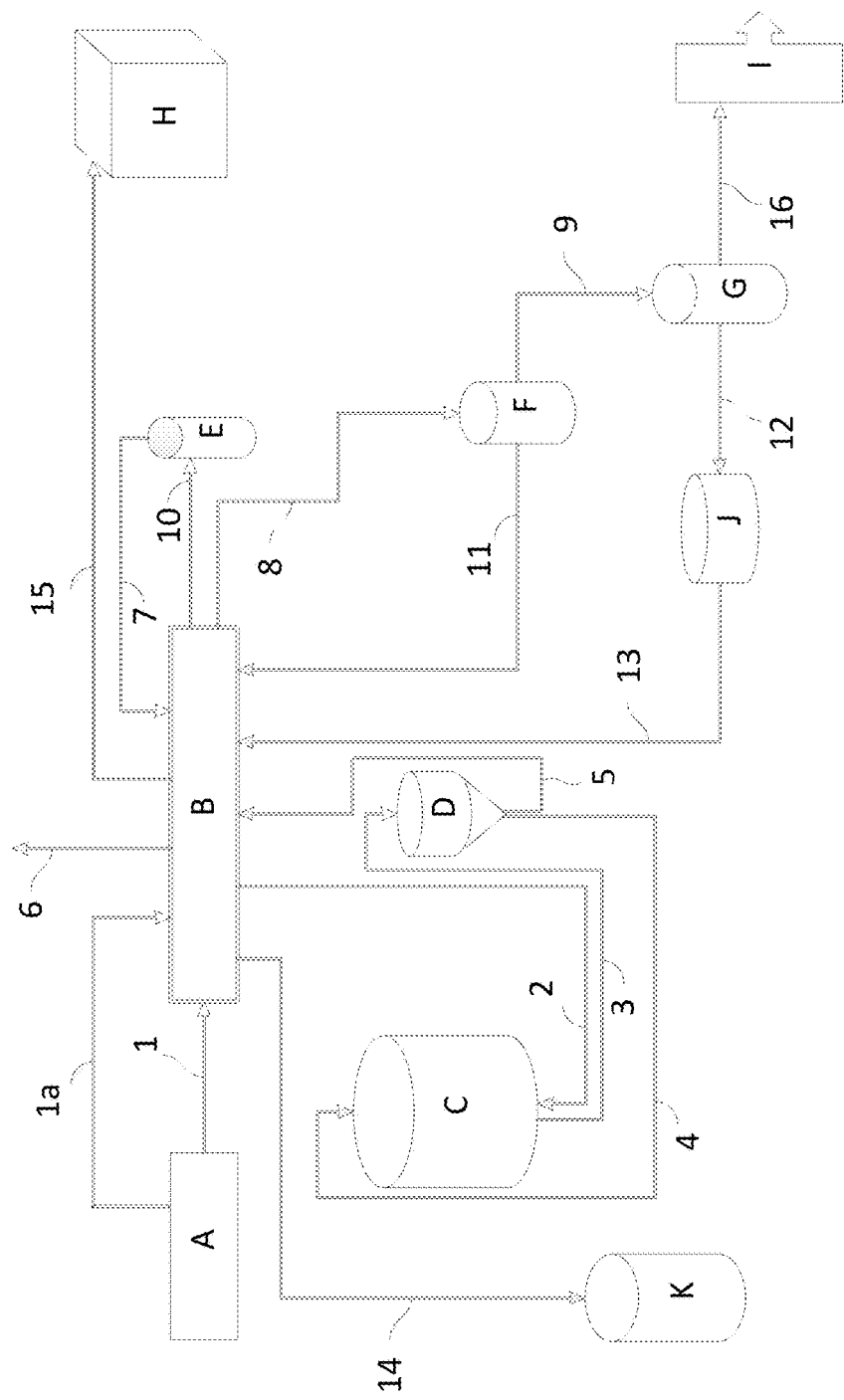
FIG. 6 illustrates an example system for processing algae-based products using recovered flue gas heat, consistent with embodiments disclosed herein.

FIG. 6 illustrates an example system for processing algae-based products using recovered flue gas heat. For example, the system may include components such as power plant A, one or more heat exchanger(s) B, emissions capture algae bioreactor C, algal de-watering and algal concentrator component D, solvent and recovered solvent storage component E, post-extraction lipid storage component F, post-skimmed algae component G, dried algae shells storage component H, extracted bio-diesel storage component I, waste glycerol extraction component J, purified glycerol storage component K, and/or other such components.

The above components may be coupled together by pipes, enclosures, pumps, valves or other connecting mechanisms as identified in the following process steps identified in FIG. 6. For example, post-combustion flue gas from power plant A may be delivered to heat exchanger B at a high by a pipe 1. The temperature of hot flue gas, for example, may be at or below 480°. Alternatively, flue gas from power plant A may be delivered to heat exchanger B via pipe 1a at a reduced temperature. The reduced temperature of the flue gas, for example, may be at or below 148°. Heat exchanger B may be connected to algae bioreactor C by connector 2. Algae bioreactor C may be connected to algal de-watering and algal concentrator component D by connector 3. Algal de-watering and algal concentrator component D may re-introduce supernatant byproduct of algae processing with nutrients back to algae bioreactor C. Algae paste produced by algal de-watering and algal concentrator component D may be delivered to heat exchanger B via pipe 5. The steam resulting from algal paste delivered to heat exchanger B may be released by valve 6. Various organic solvents may be delivered from solvent and recovered solvent storage component E to heat exchanger B by pipe 7. Extracted algae oil and algae shells may be delivered from heat exchanger B to post-extraction lipid storage component F via pipe 8. Algae oil skimmed from the top of post-extraction lipid storage component F may be delivered to post-skimmed algae component G for transesterification and/or to extracted bio-diesel storage component I via pipe 9. Recovered organic solvents may be delivered from heat exchanger B to solvent and recovered solvent storage component E via pipe 10. Algal shells may be delivered via pipe 11 from post-extraction lipid storage component F to heat exchanger B for solvent recovering, drying, and/or other purposes. Waste glycerol from the transesterification process may be pumped via pipe 12 from post-skimmed algae component G to waste glycerol extraction component J. Waste glycerol may be delivered via pipe 13 from waste glycerol extraction component J to heat exchanger B for removal of any organic solvents. Purified and filtered glycerol may be delivered from heat exchanger B to purified glycerol storage component K for re-use and/or removal via pipe 14. Dried algae shells may be delivered from heat exchanger B to dried algae shells storage component H via pipe 15. Bio-oil from post-skimmed algae component G may be delivered to extracted bio-diesel storage component I via pipe 16.

Figure 7:
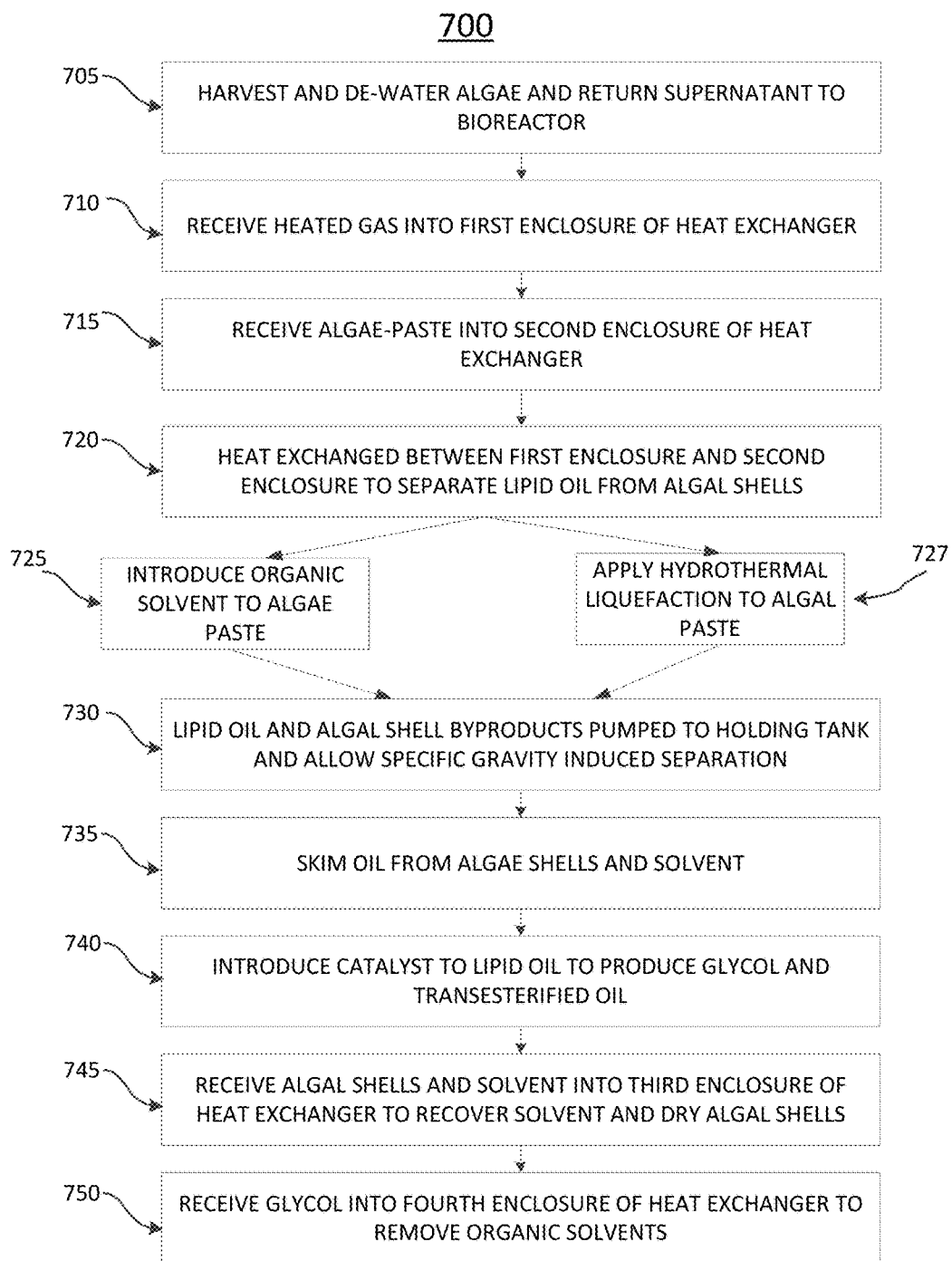
FIG. 7 discloses an example process for processing algae-based products using recovered flue gas heat, consistent with embodiments disclosed herein.

FIG. 7 discloses an example method for processing algae-based products using recovered flue gas heat. For example, a method for processing algae-based products using recovered flue gas heat 700 may include harvesting and de-watering algae from a bioreactor, and returning a supernatant to the bioreactor at step 705. For example, the algae may be grown in a bioreactor similar to the bioreactor described in reference to FIGS. 1 through 5 above. The algae may be grown by introducing a lipid trigger along with flue gas from a power plant. The de-watering may be performed in an algal de-watering and algal concentrator D as illustrated in FIG. 6. The de-watering process may be performed using a thin film membrane, flocculation, filter press, or other de-watering process as would be known in the art. Following de-watering, an algal paste may be pumped into a heat exchanger, while the supernatant byproduct is sent back to the bioreactor for use in growing more algae.

Method 700 may also include receiving heated gas into a first enclosure of a heat exchanger at step 710. For example, the heat exchanger may be coupled to an exhaust from a power plant and receive hot flue gas. In some examples, the heat exchanger may be coupled to the output end of the exhaust system from the power plant where some heat has already dissipated (e.g., in excess of 200 degrees Celsius in some cases). In other examples, the heat exchanger may be coupled closer to the input end of the exhaust system, and closer to where power is being generated, where flue gas is very hot (e.g., in excess of 400 degrees Celsius in some cases). The flue gas may then exit the heat exchanger and be directed into the bioreactor at a much cooler temperature (e.g., less than 40 degrees Celsius).

Method 700 may further include receiving the algal paste at an input end of a second enclosure of the heat exchanger at step 715. The algal paste may be pumped through the second enclosure of the heat exchanger to exchange heat with the flue gas passing through the first enclosure of the heat exchanger. An organic solvent may also be introduced to the algal paste at step 720 (i.e., either while the algal paste is in the heat exchanger, or before it reaches the heat exchanger). Heat and organic solvent may assist in separating the algal lipid oils from the algal shells (i.e., the algae's cell wall) at step 725. Alternatively, in some embodiments, hydrothermal liquefaction may be used to separate the algal lipid oils from the algal shells at step 727. The separated lipid oil and algal shell byproduct may then be pumped out of the second enclosure of the heat exchanger and into a holding tank at step 730.

While in the holding tank, lipid oil will rise towards the surface as a result of specific gravity, and the algal shells and organic solvent will remain lower in the holding tank. As a result, the lipid oil may be skimmed off the top of the holding tank at step 735. In some examples, the lipid oil may be pumped out and used for various bio-oil products.

The algal shells and solvent may be pumped into a third enclosure of the heat exchanger at step 745. For example, the heat from the flue gas may be used to separate or distil the solvent from the algal shells. The solvent may than be captured, e.g., through a gas release valve and containment enclosure, where it can be collected for reuse. The dry algal shells may also be extracted for use.

In some embodiments, a catalyst may be introduced to the lipid oil to transesterfy the lipid oil, e.g., into a bio-diesel oil product, at step 740. For example, the catalyst may be methanol, ethanol, or other transesterification catalysts as known in the art. The transesterification process may also create glycol, which may be separated from the bio-diesel, e.g., using specific gravity or other methods as known in the art. The glycol may then be pumped into a fourth enclosure of the heat exchanger at step 750. The heat from the flue gas may than be used to remove any organic solvents from the glycol, i.e., using a distillation process. The organic solvents may than be collected for reuse.

Figure 8:
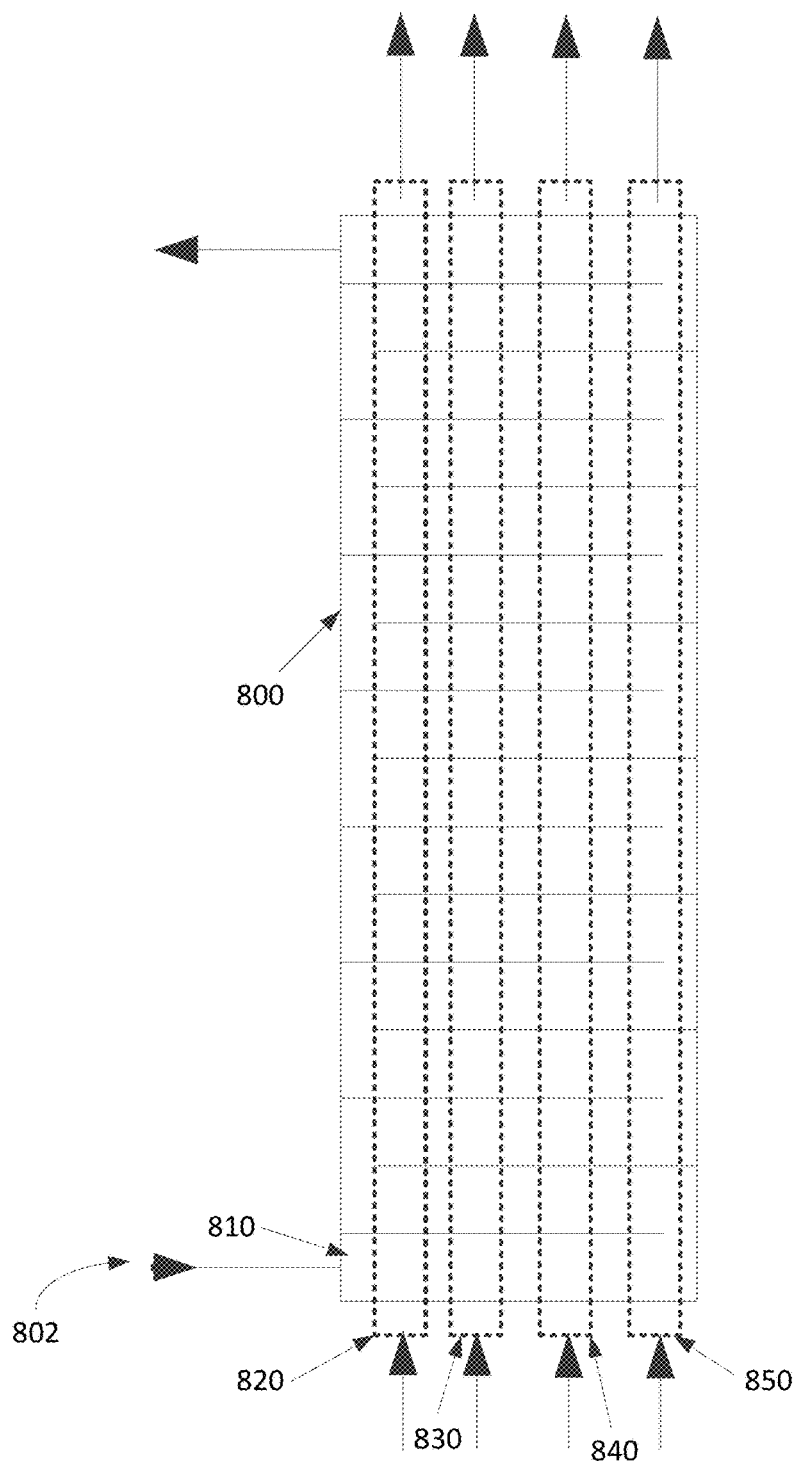
FIG. 8 illustrates a heat exchanger system, consistent with embodiments disclosed herein.

FIG. 8 illustrates a heat exchanger system. For example, a heat exchanger 800 may include an enclosure for receiving hot input gas 810. The hot input gas may enter through a first enclosure input 802. For example, the hot input gas may be flue gas from a power plant, geothermal gases, or other hot gases as known in the art. The gas may pass through the interior of the first enclosure 810. The interior of the first enclosure may have=increased surface area of the enclosure walls. For example, a serpentine pattern for winding the gas through the inside of the enclosure using piping is one such way of increasing surface area of the enclosure walls to increase the active heat exchange surface. Heat exchanger 800 may also include a second enclosure 820 for receiving a material intended to exchange heat with the heated input gas. For example, as disclosed herein, an algal paste may be pumped through enclosure 820. Enclosure 820 may share or contact enclosure walls with enclosure 810 to exchange heat.

In some embodiments, additional enclosures may also pass through heat exchanger 800 to enable multiple materials to exchange heat with the heated input gas, and at varying controlled temperatures. For example, the input gas may cool as it dissipates heat to the material disposed within the second enclosure 820, but before reaching the additional enclosures 830, 840, or 850. Although four such enclosures are illustrated in FIG. 8, one of skill in the art would appreciate that the heat exchanger may have fewer or greater enclosures as required for the specific use, and depending on the number of materials that require heat from the heated input gas. The heat exchanger may also take on different structural forms as known in the art.

Many embodiments of the disclosure recite monitoring of environmental sensors, such as temperature, $CO_2$ or $0_2$ level, pH, pressure, and flow sensors, as well as adjusting multiple valve settings to control hydraulic and pneumatic flow or release rates. The monitoring of these sensors and adjustment of these controls may be accomplished manually or automatically. In either of these scenarios, computing modules and software may be utilized to accurately and efficiently enable control of optimal environmental conditions. For example, a computer processing module may be programmed to: (i) monitor the aforementioned environmental sensors, (ii) calculate optimal growing conditions for the algae based on data from the environmental sensors and known target conditions, and (iii) adjust settings on the heat exchanger, nutrients infuser, pH control system, bubblers, or any of the pressure release or flow valves to optimize and achieve those environmental conditions.

Figure 9:
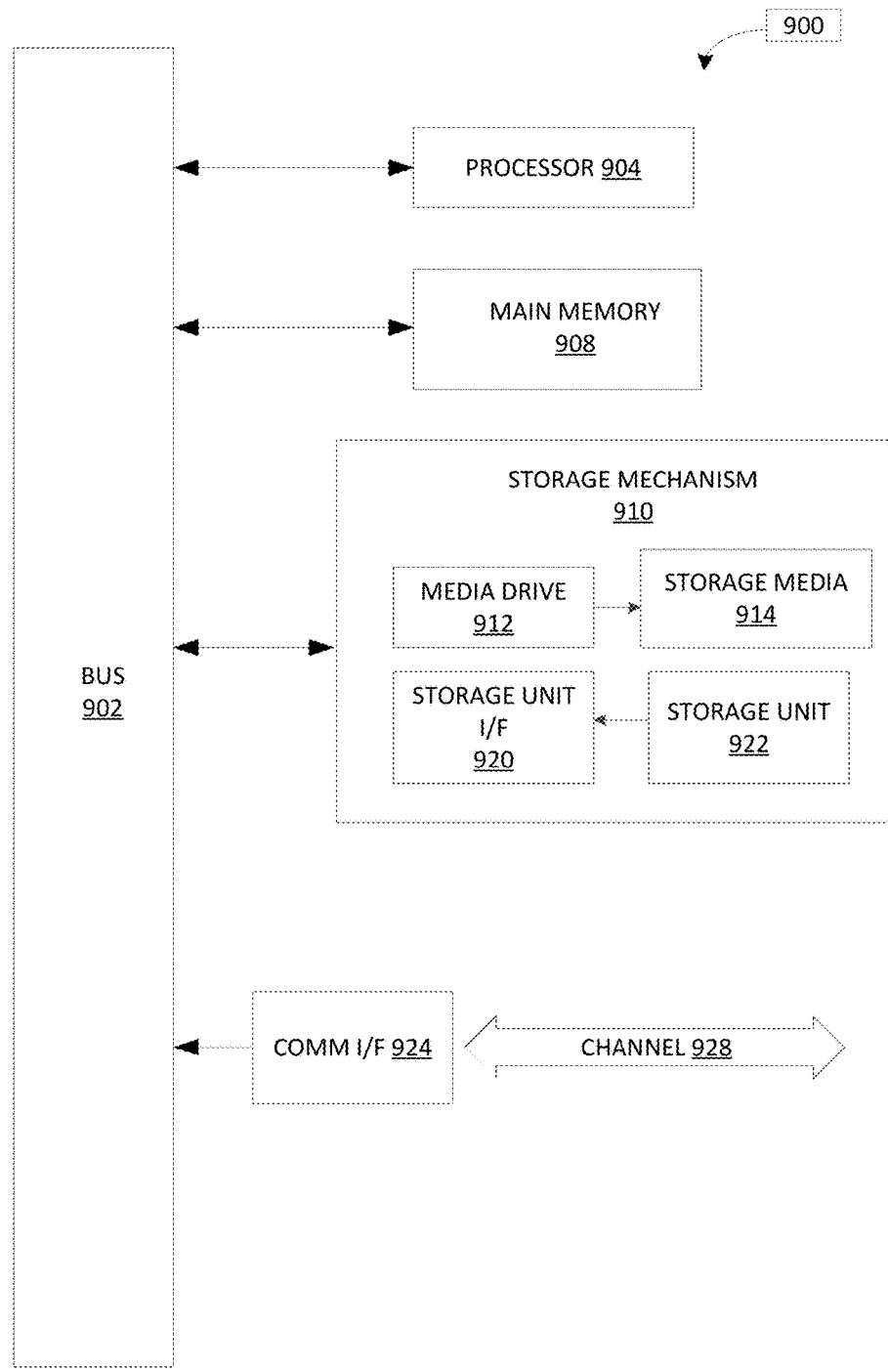
FIG. 9 illustrates an example computing module that may be used to implement various features of the systems and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the application using other computing modules or architectures.

Referring now to FIG. 9, computing module 900 may represent, for example, computing or processing capabilities found within desktop, laptop, notebook, and tablet computers; hand-held computing devices (tablets, PDA's, smart phones, cell phones, palmtops, smart-watches, smart-glasses etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, a magnetic tape drive, an optical disk drive, a CD or DVD drive (R or RW), or other removable or fixed media drive might be provided. Accordingly, storage media 914 might include, for example, a hard disk, a solid state drive, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and a storage interface 920. Examples of such storage units 922 and storage interfaces 920 can include a program cartridge and cartridge interface, a removable memory (for example, a flash memory or other removable memory module) and memory slot, a PCMCIA slot and card, and other fixed or removable storage units 922 and storage interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 908, storage unit 920, media 914, and channel 928. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing module 900 to perform features or functions of the present application as discussed herein.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

The invention claimed is:

1. A method for processing algae, comprising:
   receiving a heated flue gas in a first enclosure of a heat exchanger;

receiving an algal paste in a second enclosure of the heat exchanger;

introducing an organic solvent to the algal paste;

extracting an algal oil and a plurality of algal shells from the algal paste by dissipating heat from the first enclosure to the second enclosure; and extracting the algal oil from the organic solvent and the algal shells;

wherein the flue gas is a gas rich in $CO_2$.

2. The method of claim 1, further comprising producing the algal paste by de-watering a plurality of algae organisms harvested from an algae growing system using a de-watering process.

3. The method of claim 2, further comprising harvesting the plurality of algae organisms by skimming a surface of a water in each processing cell of the algae growing system to collect algae present on the water.

4. The method of claim 2, wherein the de-watering process comprising a thin film membrane, a flocculation, or a filter press.

5. The method of claim 2, further comprising returning a supernatant byproduct of processing the algal paste in the second enclosure of the heat exchanger to the algae growing system.

6. The method of claim 1, further comprising receiving the organic solvent and the algal shells in a third enclosure of the heat exchanger.

7. The method of claim 1, further comprising transesterifying the extracted algal oil by using a catalyst into a bio-oil product.

8. The method of claim 7, further comprising extracting glycol from the bio-oil product.

9. The method of claim 7, wherein the catalyst comprises methanol, ethanol, and/or other transesterification catalyst.

10. The method of claim 1, further comprising a computing device electronically coupled to a non-transitory computer readable medium having computer executable program code embodied thereon, the computer executable program code configured to cause a computing device to monitor the environmental sensors and adjust the pressure release valve according to a set of optimal environmental settings.

11. A method for processing algae, comprising:

harvesting a plurality of algae organisms by skimming a surface of a water in each processing cell of an algae growing system to collect algae present on the water surface;

producing an algal paste by de-watering the plurality of algae organisms;

receiving a heated flue gas in a first enclosure of a heat exchanger;

receiving the algal paste in a second enclosure of the heat exchanger;

introducing an organic solvent to the algal paste;

extracting an algal oil and a plurality of algal shells from the algal paste by dissipating heat from the first enclosure to the second enclosure;

returning a supernatant byproduct of extracting the algal oil from the algal paste to the algae growing system;

receiving the organic solvent and the algal shells in a third enclosure of the heat exchanger; and extracting the algal oil from the organic solvent and the algal shells;

wherein the heated flue gas is a gas rich in $CO_2$.

12. The method of claim 11, further comprising transesterifying the extracted algal oil by using a catalyst into a bio-oil product.

13. The method of claim 12, further comprising extracting glycol from the bio-oil product.

14. The method of claim 12, wherein the catalyst comprises methanol, ethanol, and/or other transesterification catalyst.

* * * * *